(12) United States Patent
Wendland et al.

(10) Patent No.: US 11,485,380 B2
(45) Date of Patent: Nov. 1, 2022

(54) METHOD AND CONTROL DEVICE FOR WARNING A DRIVER OF A MOTOR VEHICLE AND MOTOR VEHICLE WITH SUCH A CONTROL DEVICE

(71) Applicant: Volkswagen Aktiengesellschaft, Wolfsburg (DE)

(72) Inventors: Hannes Wendland, Wolfsburg (DE); Marius Spika, Braunschweig (DE); Jan Sonnenberg, Didderse (DE); Theodor Heinze, Helmstedt (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 18 days.

(21) Appl. No.: 17/266,501

(22) PCT Filed: Jul. 30, 2019

(86) PCT No.: PCT/EP2019/070403
§ 371 (c)(1),
(2) Date: Feb. 5, 2021

(87) PCT Pub. No.: WO2020/030467
PCT Pub. Date: Feb. 13, 2020

(65) Prior Publication Data
US 2021/0300402 A1    Sep. 30, 2021

(30) Foreign Application Priority Data

Aug. 7, 2018    (DE) .................... 10 2018 213 230.5

(51) Int. Cl.
*B60Q 1/00* (2006.01)
*B60W 50/14* (2020.01)
(Continued)

(52) U.S. Cl.
CPC ............ *B60W 50/14* (2013.01); *B60W 30/09* (2013.01); *B60W 30/0956* (2013.01);
(Continued)

(58) Field of Classification Search
CPC .. B60W 50/14; B60W 30/09; B60W 30/0956; B60W 40/08; G06V 20/58; G06V 20/597; H04W 4/40
(Continued)

(56) References Cited

U.S. PATENT DOCUMENTS 8,994,520 B2    3/2015   Stählin et al. ............... 340/436
9,767,687 B2 *  9/2017   Gupta ...................... B60C 9/00
(Continued)

FOREIGN PATENT DOCUMENTS

CN      107444406 A      12/2017   ............ B60W 30/18
DE      102004019337 A1  11/2005   ............ B60K 31/00
(Continued)

OTHER PUBLICATIONS

German Office Action, Application No. 102018213230.5, 6 pages, dated Feb. 21, 2019.
(Continued)

*Primary Examiner* — Tai T Nguyen
(74) *Attorney, Agent, or Firm* — Slayden Grubert Beard PLLC

(57) ABSTRACT

A method for warning a driver of a motor vehicle and to a control device for a motor vehicle are disclosed. The method comprises: steps: receiving, using the vehicle, position data of a first object from a communication device external to the vehicle; detecting a vehicle environment by a detection device of the motor vehicle and detecting an own position of the motor vehicle. In addition, determining if the detection device detects a second object hiding the first object in a field of view between the motor vehicle and the first object, and determining if in a potentially critical situation for the motor vehicle results from the first object. If it is recognized that the first object is hidden and that the potentially critical situation for the motor vehicle results from the first object, a specified warning cascade is initiated.

20 Claims, 2 Drawing Sheets

(51) Int. Cl.
  *H04W 4/40* (2018.01)
  *B60W 30/09* (2012.01)
  *B60W 30/095* (2012.01)
  *B60W 40/08* (2012.01)
  *G06V 20/58* (2022.01)
  *G06V 20/59* (2022.01)

(52) U.S. Cl.
  CPC ............ *B60W 40/08* (2013.01); *G06V 20/58* (2022.01); *G06V 20/597* (2022.01); *H04W 4/40* (2018.02); *B60W 2050/143* (2013.01); *B60W 2050/146* (2013.01); *B60W 2540/225* (2020.02); *B60W 2540/229* (2020.02); *B60W 2556/40* (2020.02); *B60W 2556/45* (2020.02)

(58) Field of Classification Search
  USPC .......................................................... 340/435
  See application file for complete search history.

(56) References Cited

U.S. PATENT DOCUMENTS

| | | | |
|---|---|---|---|
| 10,009,580 B2 | 6/2018 | Offenhaeuser et al. | |
| 2008/0027607 A1 | 1/2008 | Ertl et al. | 701/36 |
| 2012/0268262 A1 | 10/2012 | Popovic | 340/438 |
| 2019/0176829 A1* | 6/2019 | Luders | G08G 1/00 |
| 2020/0341487 A1* | 10/2020 | Hazelton | G01S 13/84 |

FOREIGN PATENT DOCUMENTS

| | | | | |
|---|---|---|---|---|
| DE | 102006059254 A1 | 6/2008 | ............ | B60K 28/06 |
| DE | 102010040803 A1 | 3/2012 | ............ | B60W 30/08 |
| DE | 102011084367 A1 | 4/2013 | ............ | B60W 30/08 |
| DE | 102012214852 A1 | 2/2014 | ............ | B60W 30/08 |
| DE | 202014003224 U1 | 7/2015 | ............ | B60W 30/08 |
| DE | 102014215057 A1 | 2/2016 | ............ | B60W 30/08 |
| DE | 102015200776 A1 | 7/2016 | ........ | B60R 21/0134 |
| DE | 102015214243 A1 | 2/2017 | ............ | B60W 30/08 |
| DE | 102016214046 A1 | 2/2018 | ............ | B60W 30/08 |
| DE | 102016011414 A1 | 3/2018 | ............ | B60W 30/08 |
| DE | 102018213230 A1 | 2/2020 | ............ | B60W 30/08 |
| EP | 1865479 A1 | 12/2007 | ............ | G08G 1/16 |
| EP | 2168815 A1 | 3/2010 | ............ | B60R 1/00 |
| EP | 2284057 A2 | 2/2011 | ............ | B60W 30/12 |
| GB | 2536474 A | 9/2016 | ............ | A61B 3/113 |
| WO | 2020/030467 A1 | 2/2020 | ............ | G06K 9/00 |

OTHER PUBLICATIONS

International Search Report and Written Opinion, Application No. PCT/EP2019/070403, 25 pages, dated Nov. 29, 2019.

Chinese Office Action, Application No. 201980066005.5, 28 pages, dated Apr. 6, 2022.

* cited by examiner

METHOD AND CONTROL DEVICE FOR WARNING A DRIVER OF A MOTOR VEHICLE AND MOTOR VEHICLE WITH SUCH A CONTROL DEVICE

CROSS-REFERENCE TO RELATED APPLICATIONS

This application claims priority to German Patent Application No. DE 10 2018 213 230.5, filed on Aug. 7, 2018 with the German Patent and Trademark Office. The contents of the aforesaid Patent Application are incorporated herein for all purposes.

TECHNICAL FIELD

The invention relates to a method and a control device for warning a driver of a motor vehicle and to a motor vehicle with such a control device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In motor vehicles, interior cameras are increasingly available, being able to detect a driver's head position and a visual attention of a driver of the motor vehicle. Based on such detection devices, it is possible to intervene in driving behavior and to support the driver as soon as it is determined that his or her attention is reduced. Such techniques for increasing driving safety nowadays play an increasingly important role in the assessment of safety systems in motor vehicles and are, for example, a relevant component of strategy programs of associations for vehicle safety, such as published by the European New Vehicle Assessment Program (Euro NCAP, for European New Car Assessment Program). To enable such adapted interventions to support the driver, however, a driver's perception must first be modeled and compared with the surroundings of the motor vehicle.

SUMMARY

An object exists to provide a solution with which it can be decided when the attention of a driver of a motor vehicle should be drawn to an object that is potentially dangerous for him.

The object is solved by a method and a control device for warning a driver of a motor vehicle according to the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
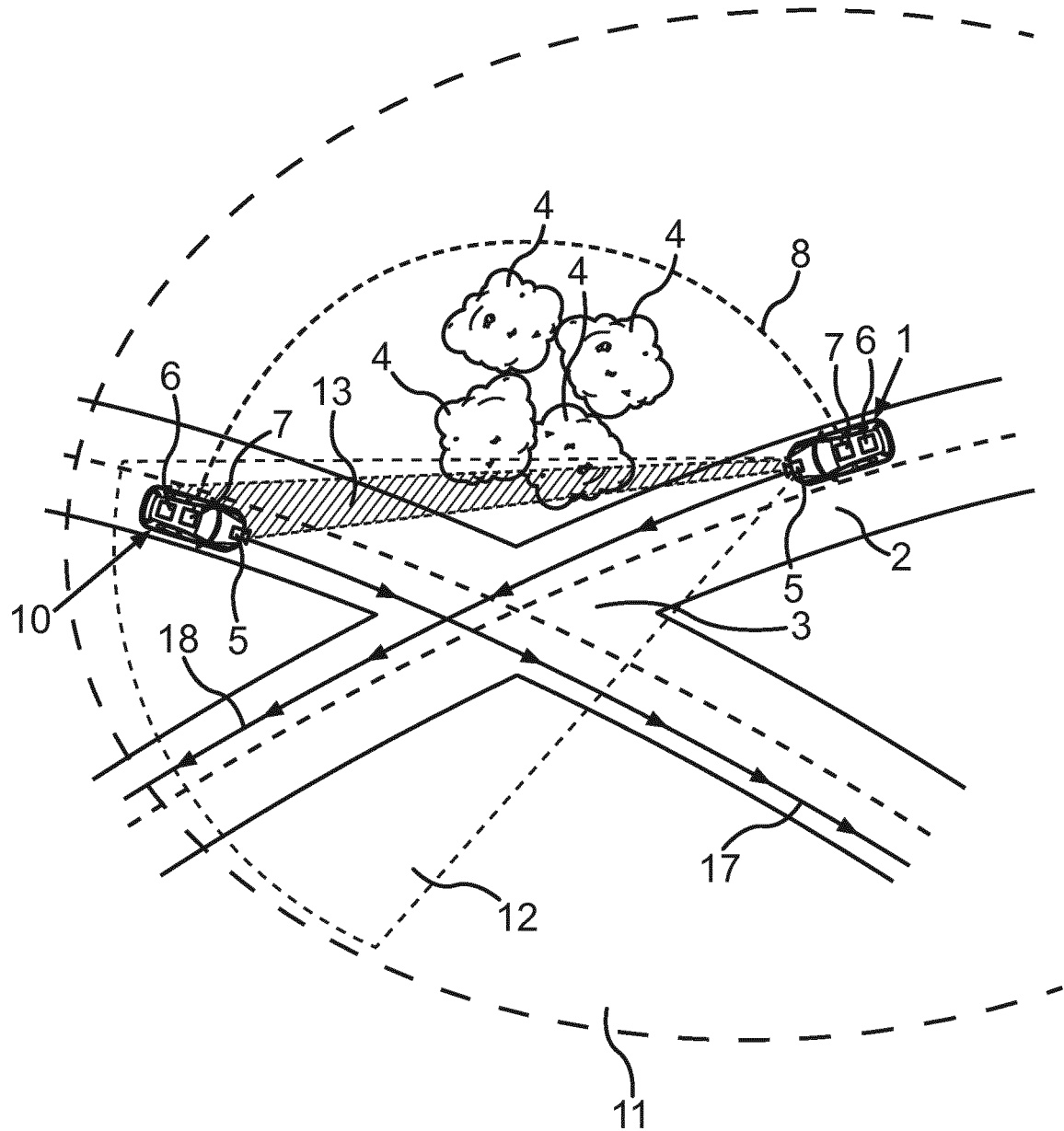
FIG. 1 a schematic representation of a motor vehicle, in the circumference of which there is a first object hidden by a second object.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for warning a driver of a motor vehicle is provided that comprises the following steps: receiving position data of a first object by means of the motor vehicle from a communication device external to the vehicle; detecting a vehicle environment by means of a detection device of the motor vehicle; detecting an own position of the motor vehicle; determining if the detection device identifies the first object and/or detects a second object hiding the first object in a field of view between the motor vehicle and the first object determined on the basis of the received position data and the own position; determining if the first object results in a potentially critical situation for the motor vehicle; if the first object is not identified by the detection device and/or if it is recognized that the first object is hidden, and if the first object results in the potentially critical situation for the motor vehicle, initiating a predetermined warning cascade.

The method of this aspect is therefore used to warn a driver of a motor vehicle about an object that for him is hidden. For this purpose, position data of a potentially hidden object, which is referred to below as the first object, are first transmitted to the motor vehicle. These position data are received by a communication device of the motor vehicle designed for this purpose, specifically for example by means of a vehicle-to-X-communication, car-to-X-communication or, in particular, car-to-car communication. The communication device external to the vehicle may thus be, for example, another road user, such as another vehicle or another motor vehicle, or an infrastructure unit or the hidden object itself, in particular another vehicle or another motor vehicle. Furthermore, the motor vehicle has data recorded by the motor vehicle itself with a corresponding recording device. The detection device comprises, for example, vehicle sensors, such as a front camera, side cameras, a rear camera, optical distance meters and speed meters, such as lidar devices (light detection and ranging), radar devices or ultrasound devices. The data provided by these devices contain information about the surroundings of the motor vehicle, for example about objects in the vicinity of the motor vehicle, such as other road users, buildings, vegetation, traffic signs, obstacles such as a hill or a mountain, people or objects. An object detected by the detection device in the vehicle environment in the following is referred to as a second object. Further, the motor vehicle has information about where it is at a current point in time. For this purpose, for example, the motor vehicle is localized with the aid of GPS data or with the aid of a comparison of the objects recognized in the vehicle environment with the detection device with information from maps stored in the motor vehicle.

Based on the data provided in the motor vehicle, that is, based on the position data of the first object, the detected vehicle surroundings and the detected own position, in a further step it is determined if the first object is hidden from the motor vehicle, i.e., if the first object may be seen in principle from the motor vehicle. For this purpose, first the field of view, meaning the area of the surroundings of the motor vehicle that is visible to the detection device and/or to a driver of the motor vehicle, is defined based on the received position data and the own position. The so-called viewing area is therefore at least a partial area of an entire detection area of the detection device. If the first object is not recognized in the viewing area determined in this way, that is, if an object detected by the detection device in the viewing area cannot be clearly identified as the first object, it may be concluded that the first object cannot be seen from the motor vehicle and is therefore hidden. In addition or as an alternative to this and in some embodiments, it may be concluded that the first object cannot be seen from the motor vehicle and is therefore hidden if a second object is detected by the detection device, which is recognized between the motor vehicle and the first object from which the position data are provided. The second object does not have to be recognized or identified here; it is sufficient if it is recognized that something, that is to say an obstacle referred to as a second object, is located between the motor vehicle and the first object.

When identifying the first object with the detection device, it may be a prerequisite that the position data of the first object are in the detection range of the detection device of the motor vehicle. If this condition is not met, it is only checked if a second object hiding the first object is detected. In addition, a minimum probability of identification may be defined and stored in the motor vehicle. As soon as the first object is identified with a probability that is greater than this minimum identification probability as the first object, the position data of which has been received from the motor vehicle, the first object is considered to be uniquely identified and therefore not hidden. This is particularly relevant with regard to a partial hiding of the first object, for example by a relatively light forest, through which the second objects hiding the first object are detected, which however may not completely cover the first object, which is why the first object may be visible for the driver of the motor vehicle. When identifying the first object, object-specific recognition features, such as a size, color and surface quality of the first object, may also be taken into account, which were received from the motor vehicle in addition to the position data of the first object.

The first object may be, for example, another vehicle, which, however, cannot be seen from the motor vehicle itself, since a hill or a forest is between the road on which the motor vehicle is traveling and the road on which the other vehicle, the first object, is traveling. The second object that hides the first object may thus be, for example, an obstacle, such as a collection of trees, which obscures the view to the first object, that is, the other vehicle. If the second object is, for example, a hill, then the motor vehicle driving behind the hill, which for example is driving on a road that crosses the road on which the motor vehicle is currently driving, may neither be detected by a radar device of the motor vehicle nor by the front and side cameras. Due to the position data transmitted by this vehicle, that is, the first object, which in this case is transmitted to the motor vehicle via car-to-car communication, the motor vehicle knows the presence and the position of this other vehicle. However, since there is an obstacle within the field of view of the other vehicle, that is to say the hill in this situation, the first object cannot be detected by the detection device of the motor vehicle. Thus, in this situation, the other vehicle cannot be identified and a second object hiding the other vehicle is also recognized.

However, the driver of the motor vehicle may still be informed of the presence of the other vehicle, that is to say of the first object. This is always performed, for example, when a potentially critical situation for the motor vehicle arises due to the detected hidden first object. In a further step of the method, it may therefore be determined if there is possibly a collision of the first object from which the position data was received with the motor vehicle. In doing so, various assumptions for a driving behavior or a movement behavior of the first object and of the motor vehicle itself are taken into account.

If it is recognized that the first object is hidden as well as it is established that a critical situation for the motor vehicle may arise due to the first object, a specific warning procedure may be conducted as part of the method. This warning procedure, the so-called warning cascade, distinguishes if the motor vehicle is still in a comfort range in relation to the location of the potentially critical situation, in which there is no acute danger to the motor vehicle and its occupants, or if the motor vehicle is already in a potential critical area or even an actually critical area. Various warning signals are output to the driver of the motor vehicle depending on how probable the actual collision with the first object is and how close in time the potential collision will take place at a current point in time, that is, the potentially critical situation will occur. These warning signals may be increased from a relatively simple display on a display surface in the vehicle interior, for example a glowing lamp or a display text, up to acoustic warning tones or even an intervention in the driving behavior, for example by automatically braking the motor vehicle in some embodiments. The warning signals therefore escalate depending on the urgency with which the driver should react to the signals. Initially, for example, a relatively less disruptive warning signal may be activated, such as the glowing lamp. If the driver does not react, this warning signal is increased, for example by additionally activating the acoustic warning tones. If this amplified warning signal does not lead to the desired reaction of the driver either, the motor vehicle may be braked automatically, for example.

In general, different sequences of the individual process steps are possible. In some embodiments, position data are first received from all objects in the vicinity of the motor vehicle and, based on this position data, it is determined if the individual objects are hidden from the motor vehicle or not, taking into account the detected vehicle environment and the vehicle's own position. For all hidden objects, it may be then determined if the respective concealed objects result in the potentially critical situation. If the potentially critical situation is given for a particular object, the specified warning cascade is initiated with reference to this object. In some embodiments, all objects in the vehicle environment that are recognized on the basis of received position data are first analyzed with regard to the potentially critical situation that could result from these objects for the motor vehicle. For all potentially critical objects, meaning all objects that may result in a potentially critical situation for the motor vehicle, a check is then made to determine if these objects are hidden by respective second objects. A corresponding warning cascade is then initiated for all the objects which result in a potentially critical situation and which were also recognized as hidden objects in the subsequent step. The order of whether a first object, whose position data was received from the motor vehicle, is initially checked with regard to a potentially critical situation resulting from this object or initially checked with regard to being hidden by a second object is therefore not fixed. The method of this aspect may therefore be used in all critical driving situations in which the concealment of an object in the vehicle environment plays a role.

By the method according to the present aspect, it is therefore possible to check a first object in the surroundings of the motor vehicle, regardless of whether it is located in an environment of the motor vehicle that may be detected by the detection device of the motor vehicle or not, to determine if it represents a potential hazard for the motor vehicle and the occupants of the motor vehicle and if it is in principle visible to a driver of the motor vehicle or if it is covered by a second object. Based on the object position and the vehicle's own position, the visibility of an object for the driver of the motor vehicle is calculated and, if necessary, the driver is informed in good time about the presence of this object and warned about it. With this method, by means of the warning signal the attention of the driver of the motor vehicle is thus also drawn to those potentially critical objects which are temporarily beyond the driver's field of view. As a warning signal, the driver's attention may be directed in the direction of the detected first object as soon as the first object is no longer covered and is therefore visible to the driver, for example by means of corresponding light signals. This also enables a particularly high sensitivity of vehicle functions for supporting and assisting a driver of the motor vehicle, in that objects that are not visible to the detection devices of the motor vehicle and to the driver of the motor vehicle are also taken into account. With the help of this method, driver assistance systems for motor vehicles that react particularly early are enabled.

In some embodiments, it is provided that the motor vehicle only receives position data from the communication device external to the vehicle when the communication device and/or the first object is located within a predetermined perimeter of the motor vehicle. The motor vehicle therefore does not receive position data of a first object that is, for example, several kilometers away from the motor vehicle. By selecting the predetermined surroundings of the motor vehicle within whose range position data of objects are received, it is thus excluded that objects that are not relevant to the motor vehicle and that for example are located too far from the motor vehicle, are received by the motor vehicle. This represents a particularly useful restriction of the data volume received by the motor vehicle, since only the data that are actually relevant for the motor vehicle are received. The specified perimeter may only relate to the communication device from which the position data are sent. For example, this may be an infrastructure facility such as a traffic light system. Only when the traffic light system is located within the specified area around the motor vehicle, information, for example about upcoming red phases of this traffic light system, are relevant for the determination of the potentially critical situations for the motor vehicle caused by this traffic light system. In addition, it is possible that the communication device that sends the position data is located outside of the specified perimeter of the motor vehicle, but that the first object detected by the communication device is located within the specified perimeter of the motor vehicle. This covers, for example, the situation that an infrastructure device such as a traffic light system detects a cyclist and transmits position data of this cyclist to the motor vehicle. If this traffic light system is outside the perimeter, but for example the cyclist is driving in the direction of the motor vehicle and has already reached the radius of the perimeter of the motor vehicle, the corresponding position data are nevertheless transmitted from the infrastructure device to the motor vehicle. Ultimately, it is thus ensured that all data relevant to the motor vehicle are actually transmitted to it.

In some embodiments, it is provided that another vehicle or an infrastructure unit comprises the communication device external to the vehicle and is the first object. It is therefore provided that the first object is another vehicle, such as another motor vehicle, or an infrastructure unit, such as a traffic light system or a building including an outside camera. This object, that is, the other motor vehicle or the traffic light system, itself transmits its own position data to a corresponding communication device of the motor vehicle with the aid of vehicle-to-X communication, car-to-X communication or car-to-car communication. This enables other vehicles or infrastructure units to send their position data to the motor vehicle, autonomously and without request or activation by another object, so that finally based on this data a warning may be provided to the driver of the motor vehicle if this other vehicle or the infrastructure unit for the motor vehicle is hidden and if due to this so-called first object a potentially critical situation exists.

According to some embodiments, it may be provided that another vehicle or an infrastructure unit comprises the communication device external to the vehicle, detects the first object with a sensor unit and the position data of this detected first object are received by the motor vehicle. It is therefore further possible that the first object is not the device that transmits the position data of the first object to the motor vehicle. The first object may therefore be, for example, a further vehicle or a further infrastructure unit that is detected by a sensor, such as a front camera of the other vehicle or an external camera of the infrastructure unit. The position data of the object recorded in this way are then transmitted to the motor vehicle by means of vehicle-to-X communication, car-to-X communication or car-to-car communication, for example. This makes it possible that within the scope of the method not only vehicles or infrastructure units that have their own communication devices for sending position data may be detected as first objects, but also other objects, such as bicycles or vehicles without vehicle-to-X communication options may be taken into account.

According some embodiments, map data, in particular 3D map data, are used to check if the second object hiding the first object is located in the field of view between the motor vehicle and the first object. Map data may thus be stored in the motor vehicle, in which, for example, forest areas are remarked. Alternatively or in addition to the vehicle environment data detected by the detection device, it may be concluded based on this map data if a second object covering the first object is located between the motor vehicle and the first object. Map data with topographic information, which may be used to estimate the height of a hill, for example, are particularly beneficial here. In doing so in particular it may definitely be determined if the field of view between the motor vehicle and the first object is actually covered by the second object, in this situation by the hill, or if the first object may still be seen from the motor vehicle, for example in the case of a relative low hill or a relatively high motor vehicle, and is only outside the detection range of the detection device. When determining the obscuration of the first object by the second object, an extension of the objects as well as of the motor vehicle is taken into account, that is, their height, length and/or width.

The concealment of the first object may be recognized in various ways. On the one hand, it may be recognized that the first object is not visible in the field of view of the motor vehicle, that is, the first object is not recognized as the first object by the detection device and/or a second object hiding the first object is detected. On the other hand, the concealment of a first object may already be known when the position data is transmitted to the motor vehicle, for example by means of vehicle-to-X communication. This is the case, for example, if the first object is detected by the sensor unit of another vehicle. With these two types of detection of the concealment, dynamic concealments of the first object are detected, which often depend on the movement of the first object. In addition, static concealments of the first object may be recognized, as it is possible, for example, by means of map data that contain information about a landscape and course of vegetation, that is, for example, have information about the positions of hills, houses and vegetation.

In some embodiments, at determining the field of view in addition to the received position data and the own position by means of the detection device, a viewing direction of the driver of the motor vehicle is taken into account and that a check is made if, starting from a starting point of view along the viewing direction between the driver and the first object a component of the motor vehicle hiding the first object is detected. The field of view of the motor vehicle between the motor vehicle and the first object may thus be specified in more detail. For this purpose, the driver's viewing direction may be taken into account, which may be determined, for example, with the aid of an interior camera that detects an eye position and a head position of the driver of the motor vehicle. The starting point of view is thus defined as the position of the driver's eyes. This now results in a more restricted field of view than just the field of view between the motor vehicle and the first object, whereby the actual visibility of the first object and thus the actual concealment by the second object may be determined particularly precisely. In addition, it is thereby possible to determine if the first object is also hidden by a component of the motor vehicle itself in addition to or instead of a second object located outside the motor vehicle. This component of the motor vehicle hiding the first object for example may be the A-pillar between the left side window and the front window of the motor vehicle, or a rearview mirror arranged in the upper area of the front window. The specified warning cascade may thus also be initiated when the first object is hidden by a component of the motor vehicle and the first object results in a potentially critical situation for the motor vehicle.

To determine the viewing direction, a driver's area of perception may be determined without accessing data from the interior camera, for example by estimating a head height area based on a set driver's seat position of the driver. Since the current head position and head rotation as well as the exact direction of view of the driver are unknown, a potential range of perception of up to 360 degrees is assumed, which thus also includes looking over the shoulder of the driver. If there is access to data of the vehicle interior, for example by means of an interior camera, this area of perception may be restricted and specified by determining the area of the current visual attention of the driver. For this purpose, the area of attention of the driver may be estimated using the head position and head rotation detected by the interior camera. A precise measurement of the area of attention may be carried out by the existing detection device by recognizing the current viewing direction. The driver's range of perception may therefore be determined with different degrees of accuracy depending on the detection device of the motor vehicle.

In some embodiments, it is provided that if it is recognized that the potentially critical situation for the motor vehicle results from the first object, but the first object is not hidden, the predetermined warning cascade is initiated only if it is determined that the driver's viewing direction is not directed to the uncovered first object. If, for example, it is determined with the help of indoor cameras that it may be concluded from the driver's eye position and head position that the driver has not seen the first object, although it is actually visible to him because it is not hidden, but that it is determined that the potentially critical situation for the motor vehicle results from this first object, the specified warning cascade, which is provided in the context of the method according to present aspect, is initiated anyway.

In addition or as an alternative to the driver's line of sight, the driver's visual attention, that is to say a probability of perception of the first object, with which the driver actually perceived the first object, may also be determined. For this purpose, properties of the driver and the vehicle environment, in particular of the first object, such as its color and surface texture, may be taken into account and it is checked if the driver is aware of the object and its relevance. This is particularly relevant for first objects arranged to the side of the motor vehicle, since these may not be seen or perceived directly by the driver, although in principle they are visible to him, but a warning about the presence and movement of this first object nonetheless makes sense to prevent a collision with this first side object.

In addition or as an alternative to this and in some embodiments, the probability of perception, that is to say the driver's visual attention, may be taken into account when assessing the potentially critical situation. Another vehicle painted in a relatively striking color, for example a red motor vehicle, is more likely to be perceived by the driver than a dark green motor vehicle, for example. If the potentially critical situation arises due to the dark green motor vehicle, for example, a stronger warning signal may be activated when the warning cascade is initiated than it would be the case in the same situation due to the red motor vehicle, since the driver, as soon as the motor vehicle drives into his field of view, will perceive the red motor vehicle more likely and more promptly than the dark green motor vehicle.

Some embodiments provide that if it is determined that the driver does not see the first object due to the detected viewing direction, the viewing direction of the driver of the motor vehicle recorded by means of the detection device is evaluated for a predetermined past period and, if it is determined that the driver has not seen the first object in that period, the predetermined warning cascade is initiated. The warning cascade is therefore not only initiated if the driver does not see the not hidden first object at a certain point in time due to his line of sight, but first of all a check is made if he did not realize the corresponding first object within a specified period, for example within the last ten seconds or within the last few minutes. Only if it is ensured, as may be ascertained in this way, that the driver has actually not yet seen the first object, the predefined warning cascade is initiated. In doing so, it may be avoided that repeated warning cascades that are triggered only on the basis of a current viewing direction of the driver of the motor vehicle and that are therefore neither necessary nor meaningful are initiated.

Alternatively or in addition to this and in some embodiments, instead of the direction in which the driver is looking, his visual attention, that is to say the probability of perception with which he perceived the first object, may be taken into account. If it is determined that the driver does not perceive the first object due to the detected viewing direction and/or the detected visual attention, the visual attention of the driver of the motor vehicle detected by means of the detection device is evaluated for a predetermined past period and, if it is determined that the driver has not noticed the first object in the period, the specified warning cascade is initiated. It is therefore estimated how aware the driver is about the object. The initiation of the warning cascade is also useful, for example, if the driver has seen the first object in the specified period, but this object has been accelerated relatively strongly in the meantime and for this reason there is now a potentially critical situation due to this object. Since the driver has not seen this acceleration of the first object, that is, has an information deficit in this regard, the warning cascade may nevertheless be initiated. Analogously to this, the warning cascade may be initiated if the second object is, for example, a bicycle that has already been seen by the driver and that changes its direction of travel while it is hidden from the driver. The driver may also be warned with the help of the warning cascade about objects that the driver has already seen, but whose presence he may have since forgotten, for example due to a stop in front of a traffic light system during which the object is hidden.

In some embodiments it is provided that, if the first object is a vehicle, current movement data are received of the first object, on the basis of which a potential movement trajectory of the first object is determined, and that if it is determined that this potential movement trajectory intersects with a potential movement trajectory of the motor vehicle, this is recognized as the resulting potentially critical situation. With the help of the current movement data of the first object, the motor vehicle has, for example, information about a current driving direction and driving speed and/or a current driving route of the first object, which is, for example, the other vehicle that has its position data using vehicle-to-X communication transmitted to the motor vehicle. Not only is the position of the first object known, but its potential movement trajectory may also be estimated. If there is a risk of collision between the first object and the motor vehicle, it may thus be determined whether the first object results in a potentially critical situation for the motor vehicle, which is for example the collision of the first object with the motor vehicle. The potential intrinsic movement trajectory of the motor vehicle may be determined, for example, on the basis of a driving route of the navigation device, or alternatively be derived from the current driving behavior. In doing so, the current driving speed and direction are taken into account. In addition, the intrinsic movement trajectory may be supported with the help of the detection of the driver using interior sensors: for example, a possible overtaking process or a possible lane change of the motor vehicle is indicated by looking over the shoulder. In addition, typical driving routes stored in the memory unit may be taken into account, the setting of a blinker, changes in speed such as braking before turning, or gesture recognition methods may be used, for example, to read the driver's intentions. These gestures may be, for example, the already mentioned look over the shoulder, a look in the rearview mirror or a head rotation. A warning of the potentially critical situation may thus be given in a particular reliable manner, thereby taking into account the potential movement trajectory of the first object and the proper movement trajectory, with several potential trajectories possibly being able to be assumed for both trajectories. Several potential trajectories result, for example, from speed variations of the driver of the other vehicle and/or the motor vehicle, branches between the current positions and the location of the potential collision or influences of other road users, such as for example further vehicles driving in front of the other vehicle or the motor vehicle. In the case of a concealed first object that results in the potentially critical situation a particular reliable support for the driver of the motor vehicle may be ensured, in particular, if several potential movement trajectories and potential proper movement trajectories may be determined and taken into account.

In some embodiments, it is also provided that for checking if the first object results in the potentially critical situation for the motor vehicle, an object criticality value quantifying a hazard potential emanating from the first object and situation criticality value qualifying a hazard potential emanating from a potential traffic situation are determined, based on which the potentially critical situation is assessed. Which level of the warning cascade, that is to say which type of warning, is issued in the event of a potentially critical situation, thus depends on two criticality values. The so-called object criticality value is used to consider where and, for example, how fast the first object is moving. In doing so it is considered, for example, if the other vehicle, which transmits its position data to the motor vehicle as the first object, is moving away from the motor vehicle itself or whether, for example, it is approaching very slowly. A very low object criticality value would result in each of these two situations. A parked vehicle transmitting its position data to the motor vehicle would have an object criticality value of almost zero, for example, since a collision with the parked vehicle may usually be ruled out if this parked vehicle does not suddenly start moving and drive towards the motor vehicle. In contrast, a vehicle that is moving at a relatively high speed towards an intersection towards which the motor vehicle itself is also moving would have a particularly high object criticality value, which will be included in the assessment of the overall situation.

The situation criticality takes into account the applicable traffic rules, for example, and thus determines criticality values depending on the lane in which the motor vehicle is moving, if the hidden first object is a traffic light system or another device relevant to traffic safety, and thus estimates the criticality of the resulting hazard potential based on the situation, which arises to the motor vehicle due to the presence of the hidden first object. A traffic light system at an intersection would, for example, reduce the criticality of the situation at the intersection, since the traffic light system sends out clear signals both to the approaching motor vehicle and, for example, to another approaching vehicle. In contrast, the criticality of the situation in the event of a potential collision of the motor vehicle with the other vehicle at an intersection without traffic lights, at which, for example, the "right before left" rule or the rules of a priority road apply, would be assessed with a higher criticality of the situation because at such an intersection there is generally a higher risk potential for the occupants of the motor vehicle and the occupants of the other vehicle. If there are several objects in the vicinity of the vehicle, the hazard potential of the overall situation is assessed and indicated as the situation criticality value.

Ultimately, by taking into account the hazard potentials, which may be quantified with the object criticality value and the situation criticality value, a particularly meaningful determination of the hazard potential that is actually to be expected in the potentially critical situation may be determined and the warning cascade may be adapted and selected accordingly. This avoids, for example, an unnecessarily intrusive warning from being issued to the driver of the motor vehicle, although due to the potentially critical situation there is only a relatively low risk potential for the occupants of the motor vehicle despite the first object being covered.

In some embodiments, if the predefined warning cascade is carried out up to an end of the warning cascade, an automatic emergency stop of the motor vehicle is carried out to avoid the development of the potentially critical situation. In the context of the warning cascade, it is possible in particular in the critical area, i.e., in the area shortly before the location and time of the occurrence of the potentially critical situation, that the motor vehicle may be brought to a stop without the driver of the motor vehicle reacting to the warning cascade. This means that the motor vehicle may be braked to a standstill with the aid of the brakes of the motor vehicle, which may be controlled electronically and thus with the aid of brake-by-wire technology, for example. As an alternative or in addition to the automatic emergency stop, an autonomous intervention, such as an evasive maneuver, may be carried out in order to prevent a collision with the first object. Even if the driver of the motor vehicle does not react to the initiated warning cascade, within the method the potentially critical situation may thus automatically be prevented shortly before it occurs. As an alternative or in addition to this and in some embodiments, the driver's reaction time may be estimated using the driver's observation with the interior camera of the motor vehicle and taken into account when selecting the warning signal. If the driver is currently distracted, for example, because he is entering a new destination in a navigation device of the motor vehicle, the driver's reaction time is delayed and the motor vehicle may be automatically stopped earlier than with an attentive driver.

Additionally or alternatively and in some embodiments, when initiating the warning cascade, it may be taken into account how long a change of viewing direction and/or perception of the previously hidden first object will take as soon as it is potentially visible to the driver or his attention is drawn to the object that has already been visible through the warning cascade. For this purpose, a delay of perception of the driver is estimated and the warning cascade, taking this delay of perception into account, is initiated particularly early so that the driver may see and perceive the first object at a desired point in time, depending on the current movement trajectory of the motor vehicle and the first object.

To determine the delay of perception of the driver, for example, a behavior of the driver is recorded by means of the detection device and/or by means of devices not included in the detection device of the motor vehicle, such as a fitness armband of the driver, and assigned to a driver's condition. Based on the driving behavior of the driver, which may be detected, for example, by the braking and acceleration behavior, by using an eyelid blinking frequency of the driver recorded with interior sensors, or by using the driver's heartbeat frequency measured with the fitness bracelet, it may be determined in which state the driver is currently. For example, a distinction may be made between the following driver states: tired, under-challenged and overstrained. Furthermore, the driver may be assigned to a driver type, such as one of the following driver types: novice driver, experienced driver, sporty driver, and cautious driver. In order to determine the type of driver, for example, person-specific data may be stored in the motor vehicle or previous journeys made by the driver in the motor vehicle may be evaluated in this regard. Depending on which type of driver is determined and which driver's condition is assigned to the driver, that is to say which cognitive state the driver is in, a typical delay of perception is selected, for example, based on fleet data. If, for example, due to the initiation of the warning cascade, a lighting device is activated in the vehicle interior which, by means of lights displayed on the display device of the motor vehicle, is intended to direct the driver's attention in the direction in which the previously hidden, not seen or not perceived first object will be seen or may be seen, these lights may be activated particularly efficiently as warning signals, coordinated with the driver, since the delay of perception is taken into account when determining the time of activation. The delay of perception may also be adapted in a driver-specific manner based on an evaluation of the delays of perception observed during past journeys by the driver in the motor vehicle and thus be personalized.

Some embodiments provide that if the first object is located behind the motor vehicle, a check is carried out to determine if the first object is hidden by the second object when the driver looks into a vehicle mirror. For example, if the first object is in the rear of the motor vehicle and may therefore only be detected by the driver looking in the rearview mirror and not by looking through the windshield or with the front sensors themselves, the method is also designed to identify hidden objects behind the motor vehicle and, if necessary, to warn of a potentially critical situation that may arise as a result. The method is thus not only designed for hidden objects in the direction of travel, but also for hidden objects located behind the motor vehicle. This enables an area that covers the entire vehicle environment, in which hidden objects that result in a potentially critical situation for the motor vehicle are realized and, if necessary, a warning is given.

Some embodiments provide that a visibility of the first object on the vehicle mirror is determined based on the received position data, predetermined imaging properties of the vehicle mirror, a position setting of the vehicle mirror and an eye position and/or head position of the driver detected by the detection device of the motor vehicle. If the first object is located in a space behind the motor vehicle and is only visible to the driver of the motor vehicle with the aid of the vehicle mirror, a potential imaging area of the first object on the vehicle mirror is determined. This imaging area may be determined based on the properties of the vehicle mirror stored in the motor vehicle, based on its adjustment and thus orientation to the driver and to the motor vehicle as well as taking into account the direction of the driver's direction of view. If a second object hiding the first object is detected between this imaging area in the vehicle mirror and the first object and the potentially critical situation for the motor vehicle also results from the hidden first object, according to the present aspect the warning cascade specified is initiated.

The predefined warning cascade may nevertheless be initiated even if the first object results in a potentially critical situation for the motor vehicle, however this first object is not hidden by a second object, but the direction of view of the driver was recorded with the help of the interior sensors in such a way that it may be assumed that he has not looked into the vehicle mirror, neither actually nor within a period that has already passed, in such a manner that he has looked at the determined imaging area, and it may therefore be assumed that he has not seen the first object in the rear of the motor vehicle. It may thus be precisely retraced if a first object located behind the motor vehicle is or was visible in the mirror when the driver looks or has looked into it. Additionally or alternatively and in some embodiments, here it may be taken into account if the first object was seen and perceived by the driver in a digital mirror displaying on a display device in the motor vehicle recordings of the rear of the vehicle environment recorded with a rear camera of the motor vehicle. In doing so, for example, blind spot warnings may be given to the driver in a particularly specific manner and also taking into account detected concealments of the first object.

According to a further exemplary aspect, a control device for a motor vehicle is also provided for warning a driver of the motor vehicle according to the method of the first aspect described above. This control device is thus designed to access data of a detection device as well as of an own position of the motor vehicle and also to receive position data of a first object via a communication connection with a communication device external to the vehicle. The control device is designed to determine, by using the received position data and the own position, a field of view and to check if a second object hiding the first object is detected in the field of view between the vehicle and the first object. In addition, the control device is designed to determine if the first object results in a potentially critical situation for the motor vehicle. The control device is designed to initiate a predefined warning cascade, if it is recognized that the first object is hidden and that the potentially critical situation for the motor vehicle results from the first object. The embodiments presented in connection with the method according to the first aspect and their benefits apply accordingly, if applicable, to the control device discussed herein.

In another exemplary aspect, a motor vehicle with the described control device, by which the described method for warning a driver of a motor vehicle may be carried out. The embodiments presented in connection with the method according to the first aspect and their benefits apply accordingly, if applicable, to the motor vehicle discussed herein.

Reference will now be made to the drawings in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

In FIG. 1, a motor vehicle 1 is sketched that is moving on a road 2 in the direction of an intersection 3. To the right of the motor vehicle 1 there is a forest consisting of numerous trees 4. Further, another vehicle 10 is approaching the intersection 3. The motor vehicle 1 and the other vehicle 10 each have a control device 6, a communication device 7 and a detection device 5, which, for example, is a front camera or a lidar device arranged in the front area of the motor vehicle 1. The motor vehicle 1 receives position data of the other vehicle 10 via a communication link 8 between the communication device 7 of the other vehicle 10 and the communication device 7 of the motor vehicle 1. The other vehicle 10 thus represents a first object 10, the position data of which are received by the motor vehicle 1. With the aid of the communication connection 8, for example, using vehicle-to-X communication, car-to-X communication or car-to-car communication, data from the other vehicle 10 are provided for the motor vehicle 1.

The other vehicle 10 is located within a predetermined circumference 11 of the motor vehicle 1 and typically also within a detection area 12 of the detection device 5 of the motor vehicle 1. Based on the position data of the other vehicle 10 received from the other vehicle 10 and based on the own position of the motor vehicle 1 detected by the motor vehicle 1 itself, in the control device 6 a field of view 13 of the motor vehicle 1 on the other vehicle 10 is determined, after the position data of the other vehicle 10 have been received. With the aid of the detection device 5, a vehicle surrounding of the motor vehicle 1 is also detected. If the other vehicle 10 is not identified by the detection device 5 in the determined field of view 13 and/or if a second object 4 is detected, which is arranged between the motor vehicle 1 and the other vehicle 10, the other vehicle 10 is identified as being hidden. Here, this second object 4 is the trees 4 which obscure the direct view of the motor vehicle 1 on the other vehicle 10.

Further, it is checked if the other vehicle 10 results in a potentially critical situation for the motor vehicle 1, for example the risk of a collision when both vehicles arrive, that is, the motor vehicle 1 and the other vehicle 10 arriving at the same potential point in time in the area of intersection 3. If it is recognized that the other vehicle 10 is hidden and that a potentially critical situation for the motor vehicle 1 results from the other vehicle 10, a predefined warning cascade is initiated. This provides, for example, differently graded warnings with different strengths depending on the proximity to the location of the potential collision between the other vehicle 10 and the motor vehicle 1. These warnings can comprise, for example, a corresponding display on a display surface in the vehicle interior of the motor vehicle 1, acoustic sound outputs or voice outputs as well as an emergency stop of the motor vehicle 1.

As an alternative to the other vehicle 10, the first object 10 can also be an infrastructure unit such as a traffic light system. The other vehicle 10 or the infrastructure unit can transmit their own position data as the so called first object to the communication device 7 of the motor vehicle 1, specifically with the aid of vehicle-to-X communication, car-to-X communication or car-to-car communication. As an alternative to this, the other vehicle 10 can also transmit position data of a first object 10 detected by the other vehicle 10, which is, for example, a bicycle or another motor vehicle 1 that does not have corresponding communication means. The other vehicle 10 or the infrastructure unit, which transmits the position data of the first object 10 to the motor vehicle 1, is located in the predetermined circumference 11 of the motor vehicle 1.

In addition or as an alternative to the environment data provided to the motor vehicle 1, which include the detected vehicle environment, the vehicle's own position and the received position data of the other vehicle 10, map data, in particular 3D map data, can also be used in the motor vehicle 1 to implement the method for warning of the driver of the motor vehicle 1. The map data can be used, for example, to check if there are trees 4 in the field of view 13 between the motor vehicle 1 and the other vehicle 10, which hide the other vehicle 10. The corresponding information about the forest located there can thus also emerge from the map data stored in the motor vehicle 1, for example. This is particularly helpful if the second object 4 is a topological elevation, such as a hill, which can be stored in the motor vehicle 1 using 3D map data.

In addition to the front camera outlined in FIG. 1 as detection device 5, it is also possible to detect a direction of view of the driver by components of the detection device 5 in the interior of the motor vehicle 1. For example, an eye position and/or a head position of the driver of the motor vehicle 1 can be determined with an inside camera, and the viewing area 13 can thereby be restricted in such a way that only that viewing area 13 is taken into account that the driver of the motor vehicle 1 actually can see in the direction of the other vehicle 10. This makes it possible, for example, that obscuring components of the motor vehicle 1 are detected, such as the A-pillar or a rear-view mirror of the motor vehicle 1. Even if no trees 4 hide the other vehicle 10 for the driver of the motor vehicle 1, it can thus be determined if the other vehicle 10 is hidden by components of the motor vehicle 1 itself and if it is therefore not visible to the driver of the motor vehicle 1.

If, based on the viewing direction of the driver of the motor vehicle 1, it is determined that the other vehicle 10 is not hidden, but both a current viewing direction of the driver and a viewing direction of the driver determined in a past period, for example in the last ten seconds, indicate that he has not seen the other vehicle 10, the specified warning cascade can nevertheless be initiated if the other vehicle 10 results in a potentially critical situation for the motor vehicle 1. The predefined warning cascade can therefore also be carried out and initiated when the other vehicle 10 is not actually hidden by the trees 4.

In addition to the position data the other vehicle 10 also transmits its current movement data, that is, for example, a current direction of travel, its current speed and a current route to the motor vehicle 1. Based on this movement data, a potential movement trajectory 17 of the other vehicle 10 can be calculated. If this potential movement trajectory 17 intersects with a potential movement trajectory 18 of the motor vehicle 1, which arises, for example, in the navigation device of the motor vehicle 1 from a route selected by the driver, this is recognized as the potentially critical situation and the specified warning cascade is initiated.

In addition, in order to figure the potentially critical situation and the associated selection of a level of the predetermined warning cascade, the hazard potential given by the other vehicle 10 and by a current driving situation can be estimated. For this purpose, on the one hand a so-called object criticality value as well as situation criticality value are determined. The object criticality value quantifies the risk potential that results from whereto and how fast the other vehicle 10 and the motor vehicle 1 are moving towards one another. A corresponding object criticality is therefore determined. The situation criticality value contains information on how high the risk potential is to be quantified under the prevailing traffic regulations, taking into account the roadway and traffic signs such as street signs or traffic lights. The situation criticality thus indicates the criticality of the potentially resulting collision of the motor vehicle 1 with the other vehicle 10, taking into account the current situation.

Figure 2:
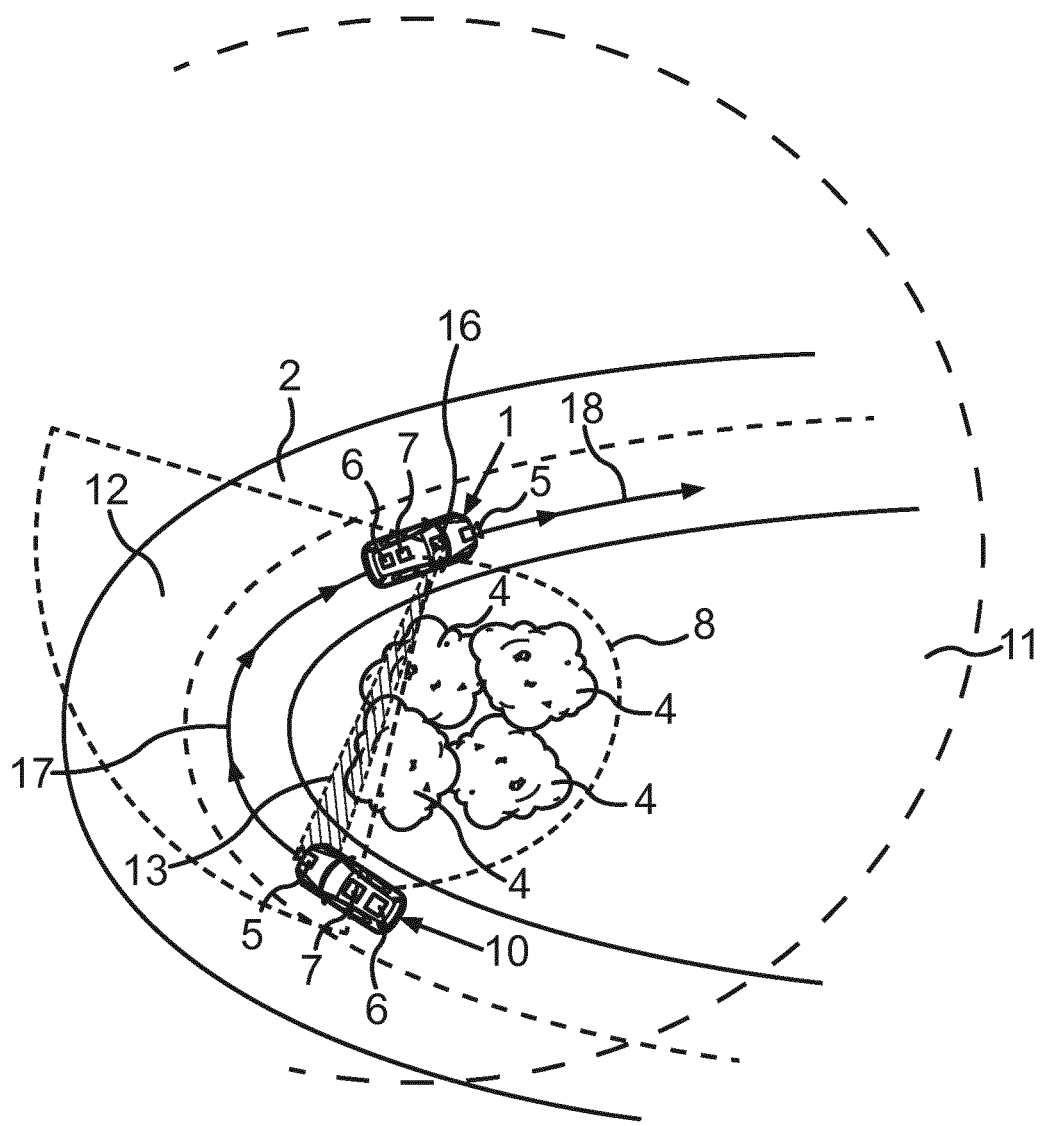
FIG. 2 a schematic representation of a motor vehicle behind which a hidden first object is located.

The motor vehicle 1 and the other vehicle 10 are also sketched in FIG. 2. In FIG. 2, however, the other vehicle 10 is driving on the same road 2 as the motor vehicle 1. The other vehicle 10 is located behind the motor vehicle 1 and can therefore in principle only be seen by the driver of the motor vehicle 1 looking into a vehicle mirror 16. The road 2, which is sketched in FIG. 2, however has a curved course, which is why the other vehicle 10 is hidden from the driver of the motor vehicle 1 by the trees 4.

A visibility of the other vehicle 10 in the vehicle mirror 16 of the motor vehicle 1 is determined based on the received position data of the other vehicle 10, predetermined imaging properties of the vehicle mirror 16, a position setting of the vehicle mirror 16 and an eye position or head position of the driver of the motor vehicle 1 detected by the detection device 5. A driver position in motor vehicle 1 is therefore taken into account for this. If the other vehicle 10 is in the rear of the motor vehicle 1 and is therefore only visible to the driver of the motor vehicle 1 with the aid of the vehicle mirror 16, if no second object, that is to say, for example, no trees 4, are detected between the imaging area of the other vehicle 10 on the vehicle mirror 16 and the position of the other vehicle 10 Object 4, but if based on the detected direction of view of the driver it can be concluded that he has not seen the other vehicle 10, but that this other vehicle 10 results in a potentially critical situation for the motor vehicle 1, the specified warning cascade is initiated. A potentially critical situation due to the other vehicle 10 driving behind the motor vehicle 1 can arise, for example, when the other vehicle 10 approaches the motor vehicle 1 particularly quickly from behind, so that there is a risk of a potential rear-end collision.

Overall, it should be noted that, on the basis of various raw data provided in the motor vehicle 1, it is determined if the first object 10, that is to say the other vehicle 10, is hidden from the view of the driver of the motor vehicle 1. These raw data include the position data of the other vehicle 10, the first object 10, provided via the vehicle-to-X, car-to-X or car-to-car communication link 8, the vehicle surroundings detected by the detection device 5, map data and location data of the motor vehicle 1 for detecting the own position of the motor vehicle 1 and information about the direction of view of the driver, for example based on sensor data from interior cameras of the motor vehicle 1, which are part of the detection device 5. It is also taken into account what intention the motor vehicle 1 has, that is, what its own movement trajectory 18 looks like. Thereupon it is evaluated which criticality results from the other vehicle 10 for the motor vehicle 1, as well as which criticality prevails due to the current driving situation and traffic situation. The driver's perception is also determined, i.e. the extent to which the other vehicle 10 is seen by the driver of the motor vehicle 1 or has already been seen or not.

As soon as there is to be assumed a hiding of the other vehicle 10 and a potentially critical situation for the motor vehicle 1 resulting from the other vehicle 10, a warning cascade takes place, depending on how close the potential accident location is and how close the expected time of the accident is. With the method, a driver of the motor vehicle 1 can thus be warned about a hidden and potentially critical first object 10 for the safety of the motor vehicle 1.

LIST OF REFERENCE NUMERALS

1 Motor vehicle
2 Street
3 Intersection
4 Tree
5 Detection device
6 Control device
7 Communication facility
8 Communication link
10 Other vehicle
11 Circumference 12 Detection area
13 Field of view
16 Vehicle mirrors
17 Movement trajectory
18 Own movement trajectory The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for warning a driver of a motor vehicle, comprising:
   receiving, at the motor vehicle, position data of a first object from a communication device, which communication device is external to the vehicle;
   detecting a vehicle environment using a detection device of the motor vehicle;
   detecting an own position of the motor vehicle;
   determining if the detection device identifies the first object in the detected vehicle environment or detects a second object in the detected vehicle environment hiding the first object in a field of view between the motor vehicle and the first object, the field of view being determined on the basis of the received position data and the own position of the motor vehicle;
   determining if a potentially critical situation for the motor vehicle results from the first object; and
   if the first object is not identified by the detection device or if it is recognized that the first object is hidden and if the potentially critical situation for the motor vehicle results from the first object, initiating of a specified warning cascade.

2. The method of claim 1, wherein the motor vehicle only receives position data from the communication device external to the vehicle if one or more of the communication device and the first object is located within a predetermined radius of the motor vehicle.

3. The method of claim 1, wherein another vehicle or an infrastructure unit comprises the communication device external to the vehicle and is the first object.

4. The method of claim 1, wherein another vehicle or an infrastructure unit comprises the communication device external to the vehicle, detects the first object with a sensor unit and the position data of this detected first object are received by the motor vehicle.

5. The method of claim 1, wherein using map data, in particular 3D map data, it is determined if the second object, which hides the first object, is located in the field of view between the motor vehicle and the first object.

6. The method of claim 1, wherein when determining the field of view in addition to the received position data and the own position, using of the detection device, a viewing direction of the driver of the motor vehicle is taken into account and a determination is made whether, starting from a starting point of view along the viewing direction between the driver and the first object a component of the motor vehicle hiding the first object is detected.

7. The method of claim 6, wherein in case it is recognized that the potentially critical situation for the motor vehicle results from the first object, but the first object is not hidden, the predetermined warning cascade is initiated only if it is determined that the driver's viewing direction is not directed to the uncovered first object.

8. The method of claim 6, wherein in case it is determined that the driver does not see the first object due to the detected viewing direction, the viewing direction of the driver of the motor vehicle recorded by the detection device is evaluated for a predetermined past period and, in case it is determined that the driver has not seen the first object in that period, the predetermined warning cascade is initiated.

9. The method of claim 1, wherein in case the first object is a vehicle, current movement data are received of the first object, on the basis of which a potential movement trajectory of the first object is determined, and in case it is determined that the potential movement trajectory intersects with a potential movement trajectory of the motor vehicle, the resulting potentially critical situation is recognized.

10. The method of claim 1, wherein for determining, whether the first object results in the potentially critical situation for the motor vehicle, an object criticality value quantifying a hazard potential emanating from the first object and a situation criticality value qualifying a hazard potential emanating from a potential traffic situation are determined, based on which the potentially critical situation is assessed.

11. The method of claim 1, wherein in case the predefined warning cascade is carried out up to an end of the warning cascade, an automatic emergency stop of the motor vehicle is carried out to avoid the development of the potentially critical situation.

12. The method of claim 1, wherein in case the first object is behind the motor vehicle, it is determined, whether when the driver looks into a vehicle mirror, the first object is hidden by the second object.

13. The method of claim 12, wherein a visibility of the first object in the vehicle mirror is determined based on the received position data, predetermined imaging properties of the vehicle mirror, a position setting of the vehicle mirror and one or more of an eye position and head position of the driver detected by the detection device of the motor vehicle.

14. Control device for a motor vehicle for warning a driver of the motor vehicle of claim 1.

15. Motor vehicle with a control device of claim 14.

16. The method of claim 2, wherein another vehicle or an infrastructure unit comprises the communication device external to the vehicle and is the first object.

17. The method of claim 2, wherein another vehicle or an infrastructure unit comprises the communication device external to the vehicle, detects the first object with a sensor unit and the position data of this detected first object are received by the motor vehicle.

18. The method of claim 3, wherein another vehicle or an infrastructure unit comprises the communication device external to the vehicle, detects the first object with a sensor unit and the position data of this detected first object are received by the motor vehicle.

19. The method of claim 2, wherein using map data, in particular 3D map data, it is determined if the second object, which hides the first object, is located in the field of view between the motor vehicle and the first object.

20. The method of claim 3, wherein using map data, in particular 3D map data, it is determined if the second object, which hides the first object, is located in the field of view between the motor vehicle and the first object.

\* \* \* \* \*